(12) United States Patent
Matsushima (10) Patent No.: US 6,450,688 B2
(45) Date of Patent: Sep. 17, 2002

(54) FLUID BEARING HAVING A FOIL ASSEMBLY

(75) Inventor: Mitsuo Matsushima, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/818,577

(22) Filed: Mar. 28, 2001

(30) Foreign Application Priority Data

Apr. 10, 2000 (JP) ........................................ 2000-113222

(51) Int. Cl.[7] ........................ F16C 17/02; F16C 27/02; F16C 32/06; F16C 25/04
(52) U.S. Cl. .................... 384/103; 384/106; 384/114
(58) Field of Search ................................ 384/103, 104, 384/114, 116, 100, 106

(56) References Cited

U.S. PATENT DOCUMENTS

| 4,277,113 A | | 7/1981 | Heshmat | |
|---|---|---|---|---|
| 4,296,976 A | | 10/1981 | Heshmat | |
| 4,415,280 A | * | 11/1983 | Agrawal | 384/106 |
| 4,552,466 A | * | 11/1985 | Warren | 384/103 |
| 4,699,523 A | * | 10/1987 | Hagemeister et al. | 384/106 |
| 4,850,721 A | * | 7/1989 | Malabre et al. | 384/106 |
| 5,228,785 A | * | 7/1993 | Saville et al. | 384/103 |
| 5,498,083 A | * | 3/1996 | Brown | 384/103 |
| 5,634,723 A | * | 6/1997 | Agrawal | 384/103 |
| 5,911,510 A | * | 6/1999 | Saville | 384/103 |
| 5,988,885 A | * | 11/1999 | Heshmat | 384/106 |
| 6,158,893 A | * | 12/2000 | Heshmat | 384/106 |
| 2001/0028752 A1 | * | 10/2001 | Matsushima | 384/103 |

FOREIGN PATENT DOCUMENTS

| JP | 55-166524 | 12/1980 |
|---|---|---|
| JP | 58-99514 | 6/1983 |

* cited by examiner

Primary Examiner—Douglas C. Butler
(74) Attorney, Agent, or Firm—Arent, Fox, Kintner, Plotkin & Kahn, PLLC (57) ABSTRACT

A fluid bearing includes a foil assembly that supports a journal inside a stationary retaining member includes a cylindrical top foil that is positioned radially inward, a cylindrical mid-foil that is positioned outside the top foil and corrugated bump foils positioned outside the mid-foil. In order to suppress a small amplitude vibration of the journal in the low rotational rate region, the bump foils, are separated into six in the circumferential direction. In order to suppress the synchronous vibration instability phenomenon, the top foil and the mid-foil are wound in opposite directions from each other. In order to suppress the whirl instability phenomenon, the sum of the frictional damping forces generated by the lower bump foils is set to be larger than the sum of the frictional damping forces generated by the upper bump foils.

13 Claims, 8 Drawing Sheets

FLUID BEARING HAVING A FOIL ASSEMBLY

BACKGROUND OF THE INVENTION

1. Field of the Invention

The present invention relates to radial type dynamic pressure fluid bearings and, in particular, to foil-type fluid bearings or fluid bearings comprising a stationary retaining member that surrounds the outer circumference of a rotating journal thereby forming an annular cavity. A foil assembly positioned in the cavity supports the journal.

2. Description of the Prior Art

Such foil-type fluid bearings or fluid bearings are known in Japanese Patent Application Laid-open No. 58-99514, Japanese Patent Application Laid-open No. 55-166524, U.S. Pat. No. 4,296,976 and U.S. Pat. No. 4,277,113.

Japanese Patent Application Laid-open No. 58-99514 discloses an arrangement having a foil assembly positioned in the cavity between a rotating journal and a cylindrical stationary retaining member and supports the journal. The foil assembly comprises a first cylindrical foil element that is disposed on the radially inner side, a second cylindrical foil element that is disposed in the middle in the radial direction and a corrugated bump foil that is disposed on the radially outer side.

Japanese Patent Application Laid-open No. 55-166524 discloses an arrangement where the foil assembly comprises a cylindrical foil that is disposed on the radially inner side and a corrugated spring pad that is disposed on the radially outer side and split into a plurality of strips in the circumferential direction.

U.S. Pat. No. 4,296,976 discloses an arrangement where the foil assembly comprises a cylindrical bearing sheet that is disposed on the radially inner side, a corrugated mid-foil disposed on the radially outer side relative :to the cylindrical bearing sheet. A cylindrical mid-plane sheet is disposed on the radially outer side relative to the mid-foil and a corrugated bottom foil is disposed on the radially outer side relative to the cylindrical mid-plane sheet. An arc-shaped curved part of the mid-foil is disposed to face radially outward.

U.S. Pat. No. 4,277,113 discloses an arrangement where the foil assembly comprises a cylindrical bearing sheet that is disposed on the radially inner side and a corrugated bump foil that is disposed on the radially outer side: The radially inner side of the bump foil slides relative to a stationary retaining member and is subjected to copper coating to increase the coefficient of friction.

Figure 5:
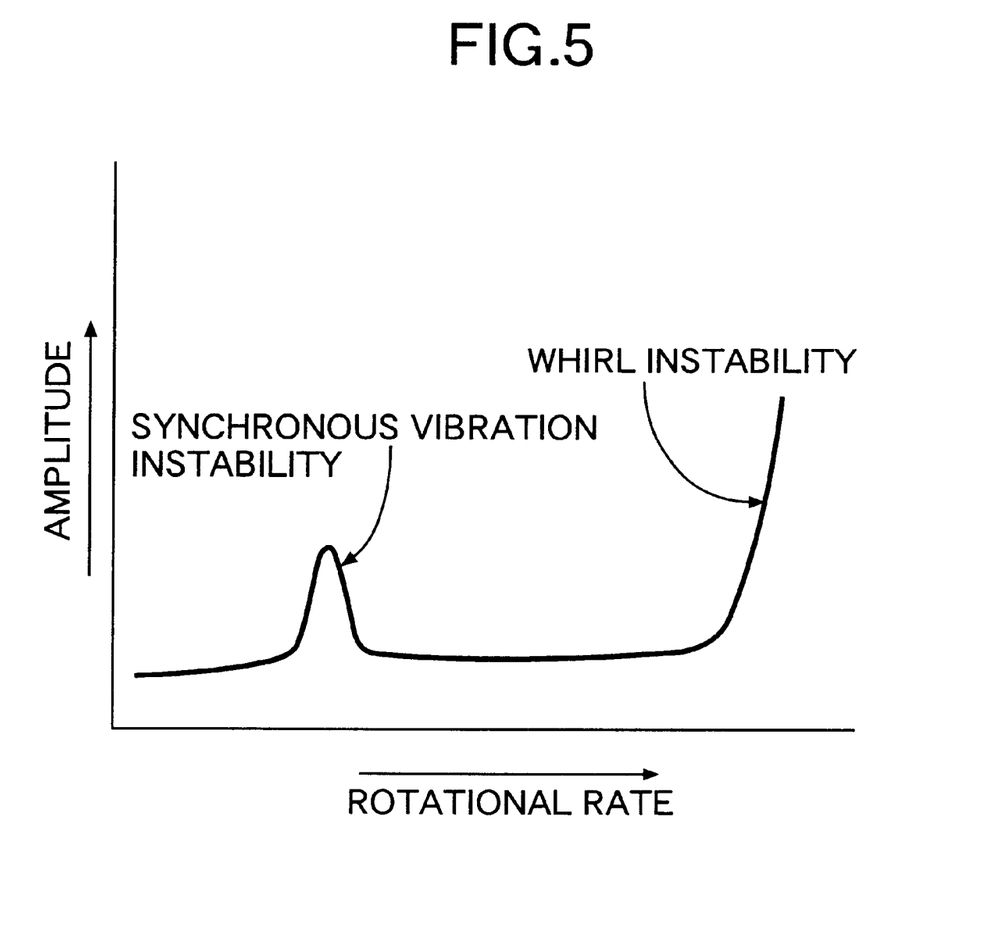
FIG. 5 is a graph showing the relationship between the rotational rate of the journal and the amplitude of the movement of the journal.

As shown in FIG. 5, such fluid bearings are known to cause an undesirable synchronous vibration instability phenomena when the rotational rate of the journal reaches a predetermined region. The bearings are also known to cause an undesirable whirl instability phenomena when the rotational rate of the journal enters a higher region.

Synchronous vibration is caused by a dynamic imbalance of a rotating part that rotates while being supported by the journal. The synchronous rotational Irate of the rotating part is determined by its weight and the supporting rigidity of the fluid bearing support. So, in order to suppress the amplitude of the synchronous vibration, it is necessary to enhance the supporting rigidity (the frictional damping force generated by the foil assembly against displacement of the journal) of the fluid bearing. However, if the frictional damping force generated by the foil assembly is increased haphazardly, such as when a small amplitude vibration occurs in the region where the rotational rate is low, it becomes difficult for each of the component elements of the foil assembly to slide against each other. Thus, it becomes difficult to generate a frictional damping force for suppressing the vibration in the aforementioned region where the rotational rate is low.

The whirl instability phenomenon is caused when the direction of eccentricity of the journal relative to the stationary retaining member and the direction of the force of the air applied to the journal based on the eccentricity are displaced by 90°, allowing the journal to whirl around the center of the stationary retaining member. The centrifugal force so generated makes the excursion of the center of the journal diverge in a spiral manner. This divergence results in the whirl instability phenomenon that constrains the upper limit of the rotational rate of the fluid bearing. Therefore, in order to increase the upper limit of the rotational rate of the fluid bearing, it is necessary to suppress the occurrence of the whirl instability phenomenon.

In view of the above-mentioned circumstances, it is an objective of the present invention to effectively suppress the vibration phenomena in a fluid bearing lover a wide rotational rate range.

SUMMARY OF THE INVENTION

In order to achieve the above-mentioned objective, in accordance with a first object of the invention, a foil-type fluid bearing or fluid bearing having a foil assembly and a stationary retaining member that surrounds the outer circumference of a rotating journal to form an annular cavity. The foil assembly is positioned in the annular cavity and supports the journal. The foil assembly comprises a top foil and a mid-foil. The top foil is cylindrically wound in one circumferential direction from one end to other end and partially disposed around the circumference of the rotating journal. One end of the top foil faces a slit formed therein in the axial direction. The one end of the top foil is fixed to the stationary retaining member on the upper half of the stationary retaining member relative to the direction of gravity. The top foil also supports the outer circumference of the journal through a fluid film layer. The mid-foil is cylindrically wound in the opposite circumferential direction from the one end to the other end and is partially disposed around the top foil. One end of the mid-foil faces another slit formed therein in the axial direction. The one end of the mid-foil is also fixed to the stationary retaining member on the upper half of the stationary retaining member relative to the direction of gravity. The mid-foil generates a frictional damping force that counteracts the radially outward movement of the journal by the inner circumference of the mid-foil frictionally and slidably contracting the outer circumference of the top foil. A plurality of bump foils are positioned between the mid-foil and the stationary retaining member and are separated ,in the circumferential direction. Each of the bump foils is made in the form of a wave to elastically deform in the radial direction and to stretch and contract in the circumferential direction. One end of each bump foil is fixed to the stationary retaining member. A frictional damping force that counteracts the radially outward movement of the journal is generated by first contacts and second contacts The first contacts are between the bump foils and the stationary member on the radially outer side of the bump foil frictionally and slidably contacting the inner circumference of the stationary retaining member. The second contacts are between adjacent waves of the bump foils on the radially inner side of the bump foil frictionally and slidably contacting the outer circumference of the mid-foil. The sum of the frictional damping forces generated by the lower bump foils positioned on the lower half of the stationary retaining member relative to the direction of gravity is set to be larger than the sum of the frictional damping forces generated by the upper bump foils positioned on the upper half.

In accordance with the first arrangement, since the bump foils are positioned between the inner circumference of the stationary retaining member and the mid-foil and comprise a plurality of separations in the circumferential direction, even a small displacement of the journal can cause any one of the bump foils to deform and exhibit a frictional damping force. Thus, it is possible to effectively suppress a small amplitude of vibration of the journal in the region where the rotational rate is low. Since the mid-foil and the top foil are wound in opposite directions from each other, when the journal vibrates with a large amplitude due to the synchronous vibration instability phenomenon the top foil and mid-foil slide in opposite directions from each other and exhibit a high level of frictional damping force. Thus, it is possible to effectively suppress the synchronous vibration instability phenomenon. Moreover, since the sum of the frictional damping forces generated by the lower bump foils positioned in the lower half of the stationary retaining member relative to the direction of gravity is set to be larger than the sum of the frictional damping forces generated by the upper bump foils positioned in the upper half, the center of rigidity of the foil assembly is displaced upward relative to the center of the stationary retaining member. Thus, it is possible to effectively suppress the whirl instability phenomenon that occurs in the region where the rotational rate is high.

Furthermore, as a second object of the invention, a fluid bearing includes a coating for changing the coefficient of friction on at least one area of the sliding faces where the bump foils and the stationary retaining member are in contact with each other.

In accordance with the second arrangement, since the coefficient of friction is changed by applying a coating to at least one area of the sliding faces where the bump foils and the stationary retaining member are in contact with each other, it is possible to further effectively suppress the synchronous vibration instability phenomenon by generating a high level of frictional damping force according to the displacement of the journal in the radial direction.

Furthermore, as a third object of the invention, a fluid bearing includes a friction foil having a coating for changing the coefficient of friction provided on at least one area of the inner circumference of the stationary retaining member where the first contacts of the bump foils are in contact.

In accordance with the third arrangement, since the coefficient of friction is changed by providing a friction foil having a coating on at least one area of the inner circumference of the stationary retaining member where the first contacts of the bump foils are in contact, it is possible to further effectively suppress the synchronous vibration instability phenomenon by generating a high level of frictional damping force corresponding to the displacement of the journal in the radial direction.

Furthermore, as a fourth object of the invention, a fluid bearing has a coating that makes the coefficient of friction of the first contacts of the lower bump foils- larger than the coefficient of friction of the first contacts of the upper bump foils.

In accordance with the fourth arrangement, since the sum of the frictional damping forces generated by the lower bump foils is made larger than the sum of the frictional damping forces generated by the upper bump foils by applying a coating to increase the coefficient of friction, it is possible to effectively suppress the whirl instability phenomenon that occurs in the high rotational rate region.

Furthermore, as a fifth object of the invention, a fluid bearing has at least one of the lower bump foils formed to be longer in the circumferential direction than the upper bump foils.

In accordance with the fifth arrangement, since the sum of the frictional damping forces generated by the lower bump foils is made larger than the sum of the frictional damping forces generated by the upper bump foils by forming at least one of the lower bump foils to be longer in the circumferential direction than the upper bump foils, it is possible to effectively suppress the whirl instability phenomenon that occurs in the high rotational rate region.

Furthermore, as a sixth object of the invention, in a fluid bearing the number of lower bump foils. is larger than the number of upper bump foils.

In accordance with the sixth arrangement, since the sum of the frictional damping forces generated by the lower bump foils is made larger than the sum:of the frictional damping forces generated by the upper bump foils by making a larger number of lower bump foils than upper bump foils, it is possible to effectively suppress the whirl instability phenomenon that occurs in the high rotational rate region.

Furthermore, as a seventh object of the invention, a fluid bearing has a distance formed between the circumferentially separated lower bump foils that is smaller than a circumferential distance formed between the circumferentially separated upper bump foils.

In accordance with the seventh arrangement, since the sum of the frictional damping forces generated by the lower bump foils is made larger than the sum of the frictional damping forces generated by the upper bump foils by making the circumferential distance between the separated lower bump foils smaller than the circumferential distance between the separated upper bump foils, it is possible to effectively suppress the whirl instability phenomenon that occurs in the high rotational rate region.

Furthermore, as an eighth arrangement of invention, a fluid bearing has at least one part of the lower bump foils formed from a material that is thicker than the material of the upper bump foils.

In accordance with the eighth arrangement, since the sum of the frictional damping forces generated by the lower bump foils is made larger than the sum of the frictional damping forces generated by the upper bump foils by forming at least one part of the lower bump foils from a material that is thicker than the material of the upper bump foils, it is possible to effectively suppress the whirl instability phenomenon that occurs in the high rotational rate region.

Furthermore, as a ninth object of the invention, a fluid bearing has at least one part of the lower bump foils formed from a material that is harder than the material of the upper bump foils.

In accordance with the ninth arrangement, since the sum of the frictional damping forces generated by the lower bump foils is made larger than the sum. of the frictional damping forces generated by the upper bump foils by forming at least one part of the lower bump foils from a material that is harder than the material of the upper bump foils, it is possible to effectively suppress the whirl instability phenomenon that occurs in the high rotational rate region.

Furthermore, as a tenth object of the invention, a fluid bearing has at least a portion of the bump foils comprising a convexly curved face projecting radially outward therefrom.

In accordance with the tenth arrangement, since at least a portion of the bump foils comprises a convexly curved face that projects radially outward, it becomes easy for the bump foils to slide against the stationary retaining member, as a result the bump foils deform from only a small displacement of the journal so exhibiting a frictional damping force. Thus, it is possible to effectively suppress a small amplitude of vibration of the journal in the low rotational rate region.

BRIEF DESCRIPTION OF THE DRAWINGS

Practical features of the present invention are described below by reference to embodiments of the present invention shown in the attached drawings;

FIG. 1 to FIG. 5 illustrate a first embodiment of the present invention.

DETAILED DESCRIPTION OF THE PREFERRED EMBODIMENTS

Figure 1:
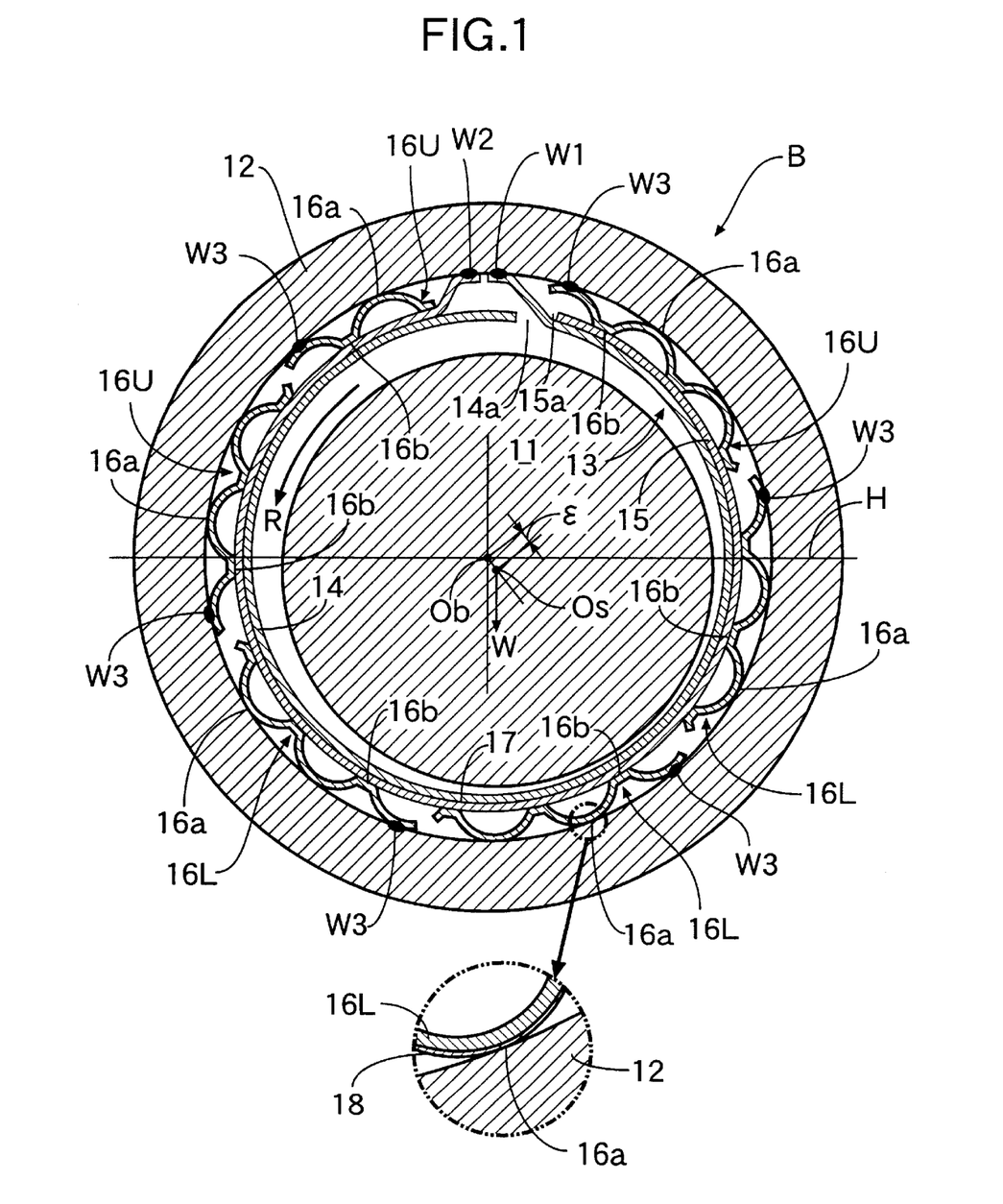
FIG. 1 is a cross-sectional view of a fluid bearing.

As shown in FIG. 1, a foil-type fluid bearing or a fluid bearing having a foil assembly B for supporting a journal 11 having a circular cross section in a rotatable manner comprises a cylindrical stationary retaining member 12 that is fixed unrotatably to surround the outer circumference of the journal 11 and a foil assembly 13 that is positioned in an annular cavity formed between the inner circumference of the stationary retaining member 12 and the outer circumference of the journal 11. The foil assembly 13 comprises a top foil, 14 disposed on the radially inner side of the stationary retaining member, a mid-foil 15 disposed outside of the top foil 1:4 and six sets of bump foils 16U, 16L disposed outside of the mid-foil 15. The top foil 14, the mid-foil 15 and the bump foils 16U, 16L are made from a material such as INCONEL™ having a thickness of about 0.1 mm. In the figure, the illustrations of the thickness of the top foil 14, the mid-foil 15 and the bump foils 16U, 16L are exaggerated.

The top foil 14 is formed by curving a flat sheet into a roughly cylindrical shape, and one end thereof that faces a slit 14a between the ends of the flat sheet is fixed by a welded part W1 to the upper part, relative to the direction of gravity, of the inner circumference of the stationary retaining member 12. The mid-foil 15 is also formed by curving a flat sheet into a roughly cylindrical shape, and one end thereof that faces a slit 15a between the ends of the flat sheet is fixed by a welded part W2. The welded part W2 of the mid-foil that is in the vicinity of the welded part W1 of the top foil on the upper part of the inner circumference of the stationary retaining member 12. The top foil 14 is wound in a clockwise direction from the end that is fixed by the welded part W1 towards the other end, and the mid-foil 15 is wound in a counter-clockwise direction from the end that is fixed by the welded part W2 towards the other end. The outer circumference of the top foil 14 and the inner circumference of the mid-foil 15 are in contact with each other in a slidable manner on sliding faces 17.

The six bump foils 16U, 16L comprise three upper bump foils 16U disposed along the upper half of the inner circumference of the stationary retaining member 12 and three lower bump foils 16L disposed along the lower half thereof. One end of each of the bump foils 16U, 16L is fixed by a welded part W3 to the inner circumference of the stationary retaining member 12. Each of the bump foils 16U, 16L is a corrugated member in which partial cylinder parts projecting radially outward are connected to each other. First contacts 16a formed on the tip ends of the partial cylinder parts are in contact with the inner circumference of the stationary retaining member 12 such that they can freely slide in the circumferential direction. Generally flat-shaped second contacts 16b formed between the adjacent partial cylinder parts are in contact with the outer circumference of the mid-foil 15 such that they can freely slide in the circumferential direction.

The three upper bump foils 16U are positioned on the upper side relative to the horizontal plane H that passes through the center Ob of the stationary retaining member 12. Each of the right and left upper bump foils 16U, 16U comprises two first contacts 16a, 16a and three second contacts 16b. The central upper bump foil 16U is formed to have a shorter circumferential length than that of the right and left upper bump foils 16U, 16U. As a result, the central upper bump foil 16U has only one first contact 16a and two second contacts 16b, 16b. In contrast, all three lower bump foils 16L disposed on the lower side relative to the horizontal plane H that passes through the center Ob of the stationary retaining member 12, have identical dimensions and individually comprise two first contacts 16a, 16a and three second contacts 16b. Furthermore, a copper coating 18 is applied to the outer circumference of the lower bump foils 16L, which face the inner circumference of the stationary retaining member 12.

Although the lower end of the left-hand upper bump foil 16U extends below the horizontal plane H, the three upper bump foils 16U are primarily above the horizontal plane H. Moreover, although the upper end of the right-hand lower bump foil 16L extends above the horizontal plane H, the three lower bump foils .6L are primarily below the horizontal plane H.

The journal 11 is supported in a rotatable manner in the inner space of the foil assembly 13, specifically within the inner space of the roughly cylindrical top foil 14. There is a slight clearance between the journal 11 and the top foil 14. Although the clearance is about 20 μm on average, the illustration in the figures is exaggerated. When the journal 11 receives a downward load W due to gravity, the journal rotates in the direction of the arrow R (counter-clockwise) in an equilibrium position. During rotation, the center Os of the journal 11 is eccentrically displaced from the center Ob of the stationary retaining member 12 by a distance ε. Therefore, any air,that is present between the journal 11 and the top foil 14 is entrained by the journal 11 and thrust into the wedge-shaped space beneath the journal 11 generating a positive pressure. At the same time, a negative pressure is generated in the wedge-shaped space above the journal 11. The journal 11 is supported in a non-contact state inside the foil assembly 13 in the equilibrium position in which the force of the air is balanced by the load W.

When the journal 11 is displaced radially outward from the equilibrium position due to the action of an external force or a change in the force of the air, the journal 11 thrusts the foil assembly 13 by the air film layer to deform the foil assembly. As a result, the frictional resistance of the sliding faces caused by the displaced journal generates a restoring force that inhibits the movement of the journal 11. The restoring force arising from the foil assembly 13 retains the journal 11 in the equilibrium position and in a stable manner.

Figure 2:
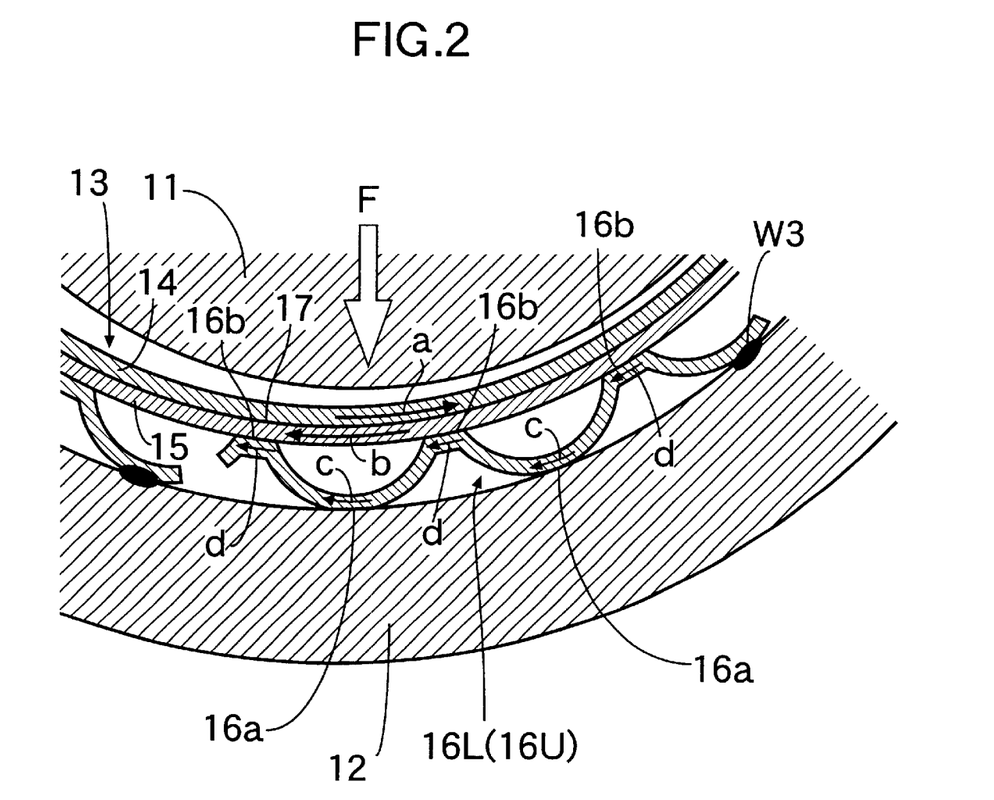
FIG. 2 is a magnified view of an essential part of FIG. 1.

As shown in FIG. 2, when a load F is applied to the top foil 14 by displacement of the journal 11 from the equilibrium position in the radial direction, the lower bump foil 16L (or the upper bump foil 16U) is constricted in the radial direction and stretched in the circumferential direction. Accordingly, the top foil 14 and the mid-foil 15 are also displaced radially outward. Since the top foil 14 and the mid-foil 15 are wound in opposite directions from each other, the top foil 14 slides in the direction of the arrow a and the mid-foil 15 slides in the direction of the-arrow b that is opposite from the direction of the arrow a. As a result, a frictional force is generated on the sliding faces 17 between the top foil 14 and the mid-foil 15. A frictional damping force that counteracts the displacement of the journal 11 is also generated.

With regard to the lower bump foil 16L (or the upper bump foil 16U) which is fixed by the welded part W3 to the inner circumference of the stationary retaining member 12, the first contacts 16a, 16a thereof move away from the welded part W3 in the direction of the arrow c. The second contacts 16b thereof similarly move away from the welded part W3 in the direction of the arrow d. As a result, the first contacts 16a, 16a slide against the inner circumference of the stationary retaining member 12 in the direction of the arrow c generating a frictional force. With regard to the second contacts 16b that move in the direction of the arrow d, a frictional force is generated between the second contacts 16b and the mid-foil 15 that moves in the direction of the arrow b which is the same direction as that of the arrow d according to their relative speed. The frictional forces applied to the first contacts 16a, 16a and the second contacts 16b generate a frictional damping force that counteracts the displacement of the journal 11.

The action of the fluid bearing B having the above-mentioned arrangement is explained below.

A vibration having a small amplitude is caused by a disturbance in the region where the rotational rate of the journal 11 is low. The region is one where the rotational rate is lower than that in the synchronous vibration instability region. shown in FIG. 5. In order to suppress this vibration, it is necessary to generate a frictional damping force by easily sliding any one of the sliding parts of the foil assembly 13 even when the journal 11 is only slightly displaced in the radial direction. In order to do so, the bump foils 16U, 16L are separated in the circumferential direction, and positioned so that their partial cylinder parts face radially outward, discussed, herein below.

In the case of a single bump foil, extending almost 360° along the inner circumference of the stationary retaining member 12, when only one part, of the bump foil is displaced in the radial direction, the entire bump foil slides; in the circumferential direction. The displacement generates high levels of frictional force between the bump foil and the inner circumference of the stationary retaining member 12 and between the bump foil and the mid-foil 15. As a result, the load caused by only a slight displacement of the journal 11 in the radial direction cannot overcome the frictional force. Since each of the sliding parts of the foil assembly 13 is in a fixed state and exhibits no frictional damping force, a small amplitude vibration of the journal 11 cannot be suppressed.

However, in the present embodiment the bump foils 16U, 16L comprise six separate portions in the circumferential direction. Therefore, when the journal 11 is displaced, only one of the bump foils 16U, 16L in the displacement direction deforms or is displaced and the remaining bump foils 16U, 16L are not displaced. The displaced bump foil 16U, 16L slides against the inner circumference of the stationary retaining member 12 and the mid-foil 15 even when the journal 11 is :slightly displaced in the radial direction. Therefore, the frictional damping force generated by sliding the bump foil against the inner circumference of the stationary retaining member 12 and the mid-foil 15, can suppress the vibration of the journal 11.

Figure 3A:
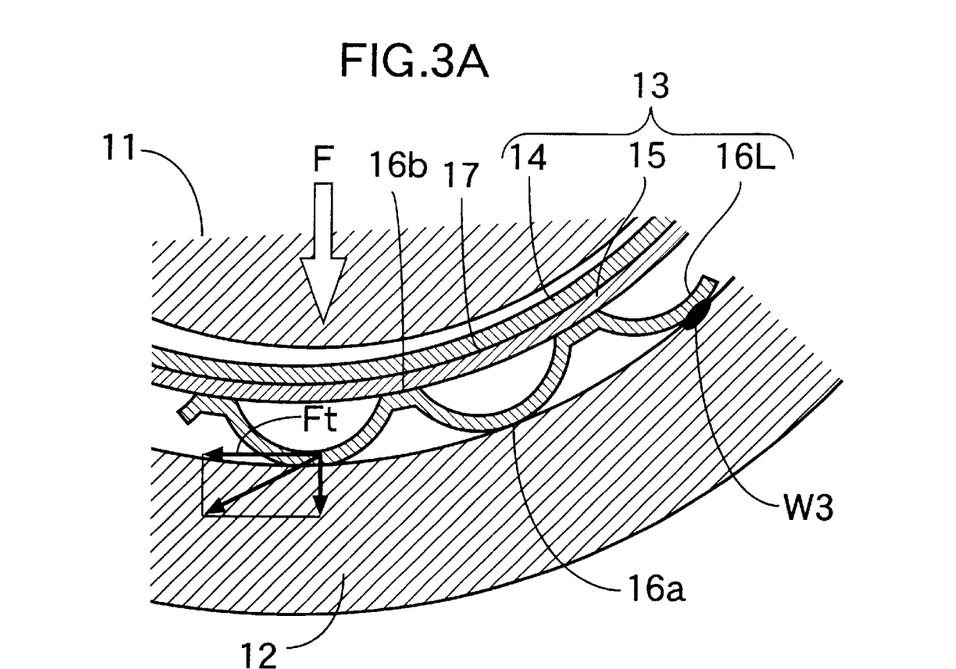
FIGS. 3A, 3B are diagrams for explaining the action of a bump foil.

As shown in FIG. 3A, when the bump foils 16U, 16L are positioned so that their partial cylinder parts face radially outward, the first contacts 16a make contact with the inner circumference of the stationary retaining member 12 with a small angle. Therefore, a high level of load Ft in the tangential direction can be generated at the first contacts 16a by a load F applied from the journal 11, and only a slight displacement of the journal 11 can easily make the first contacts 16a slide to generate a frictional damping force.

Figure 3B:
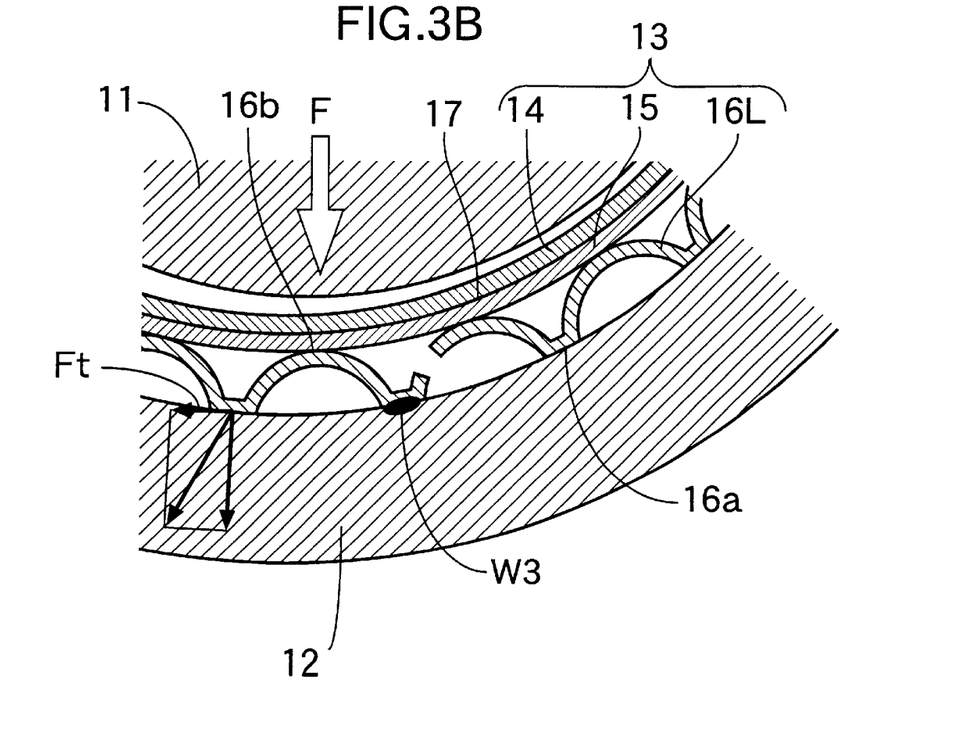

As shown in FIG. 3 B, when the bump foils 16U, 16L are positioned so that their partial cylinder parts face radially inward, the generally flat first contacts 16a that are radially outward on the bump foils 16U, 16L make contact with the inner circumference of the stationary retaining member 12 with a large angle. Therefore, only a small level of load Ft in the tangential direction can be generated at the first contacts 16a. As a result, it becomes difficult for only a slight displacement of the journal 11 to make the first contacts 16a slide, and a frictional damping force for suppressing the vibration of the journal 11 cannot be generated.

Furthermore, in order to prevent the synchronous vibration instability of the journal 11 (FIG. 5), it is necessary to generate a high level of frictional damping force in the region of the synchronous rotational rate. In order to do so, the top foil 14 and mid-foil 15 are wound in opposite directions and a copper coating 18 is applied, to the sliding face of the foil assembly, discussed hereinbelow.

Since the top foil 14 and the mid-foil 15 are wound in opposite directions, when a radially outward load F is applied from the journal 11 in FIG. 2, the top foil 14 slides in the direction of the arrow a and the mid-foil 15 slides in the direction of the arrow b that is opposite from that of the arrow a. Since sliding faces 17 of the top foil 14 and the mid-foil 15 are in contact with each other and slide in opposite directions from each other, a high level of frictional force is produced on the sliding faces 17, thus generating a frictional damping force that is large enough to suppress the synchronous vibration instability of the journal 11.

Since a copper coating 18 (FIG. 1) is applied to the outer circumference of the lower bump foils 16L, on which the first contacts 16a that are in contact with the inner circumference of the stationary retaining member 12 are formed, the coefficient of friction between the lower bump foils 16L and the stationary retaining member 12 increases generating a high level of frictional force. Therefore, a frictional damping force that is large enough to suppress the synchronous vibration instability, of the journal 11 can be generated. In order to generate a frictional damping force that suppresses the synchronous vibration instability of the journal 11, the copper coating 18 may be applied to any of the sliding faces of the foil assembly 13. Butt, in the present embodiment the copper coating 18 is applied to the lower bump foils 16L only in order to avoid the whirl instability phenomenon that will be described below.

In order to extend the upper limit of the rotational rate of the fluid bearing B by delaying the occurrence of the whirl instability (FIG. 5) in the journal 11, the rigidity of the foil assembly 13 is increased on its lower side relative to the horizontal plane H that passes through the center Ob of the stationary retaining member 12 land is decreased on the upper side thereof. The reason for delaying the occurrence of whirl instability by changing the rigidity of the foil assembly 13 on its upper and lower sides is discussed as below.

Figure 4A:
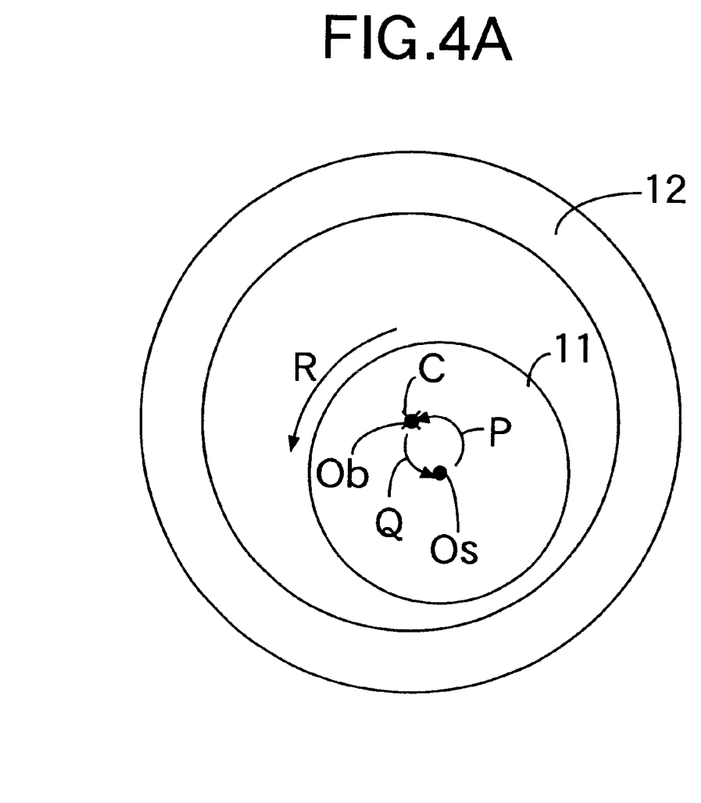
FIGS. 4A, 4B are diagrams for explaining the action of the whirl instability phenomenon.

FIG. 4 A is a schematic diagram showing the case where the rigidity of the foil assembly 13 is uniform in the circumferential direction, and the journal 11 rotates in the direction of the arrow R at the equilibrium position. The center Os of the journal 11 is eccentrically positioned towards the lower right direction from the center Ob of the stationary retaining member 12. Since the rigidity of the foil assembly 13 is made uniform in the circumferential direction, the center of rigidity C of the foil assembly 13 coincides with the center Ob of the stationary retaining member 12. When the rotational rate of the journal 11 increases in this state, the journal 11 floats due to the force of the air that is applied in an upper right direction. The center Os of the journal 11 moves along the route of the arrow P towards the center of rigidity C of the foil assembly 13 (specifically, the center Ob of the stationary retaining member 12). When the center Os of the journal 11 approaches the center Ob of the stationary retaining member 12, since the force of the air that floats the journal 11 against gravity disappears, the center Os of the journal 11 moves downward as shown by the arrow Q due to gravity. The above-mentioned action is repeated, causing the whirl instability phenomenon of the journal 11.

Figure 4B:
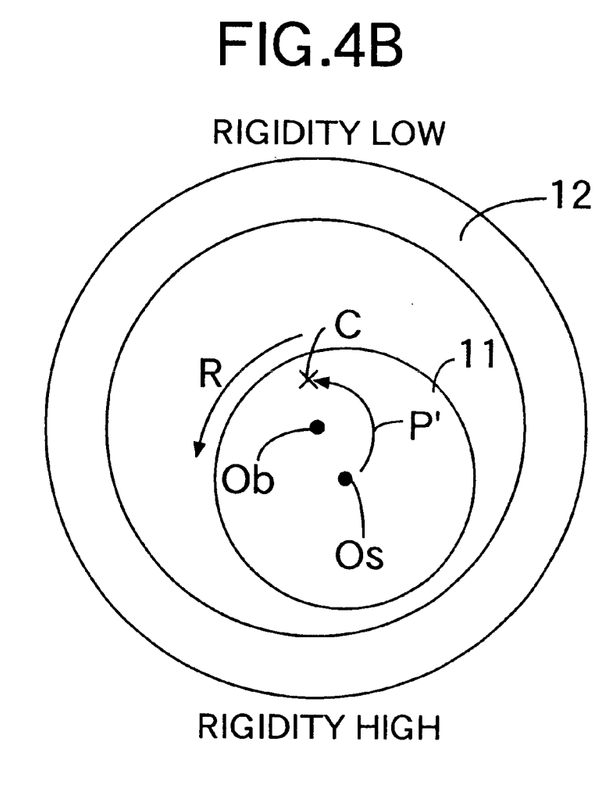

On the other hand, FIG. 4 B is a schematic diagram of the present embodiment where the rigidity of the foil assembly 13 is made non-uniform in the circumferential direction and the center of rigidity C of the foil assembly 13 is positioned upward relative to the center Ob of the stationary retaining member 12. When the journal 11 floats as the rotational rate increases, the center Os of the journal 11 moves along the route of the arrow P' towards the center of rigidity C of the foil assembly 13. But the center Os of the journal 11 does not approach the center Ob of the stationary retaining member 12 on the above-mentioned route. Therefore, it is possible to prevent the flotational force of the journal 11 from being eliminated by the center Os of the journal 11 approaching the center Ob of the stationary retaining member 12. The journal 11 is stabilized at a new equilibrium position on the route shown by the arrow P and the occurrence of the whirl instability phenomenon can be suppressed.

In the present embodiment, the rigidity of the lower half of the foil assembly 13 is higher than that of the upper half by varying the length of the upper and lower bump foils 16U, 16L and applying a copper coating 18 only to the lower bump foils 16L.

The length of the three lower bump foils 16L and the length of the right and left upper bump foils 16U, 16U are identical in the circumferential direction. However, the length of the central upper bump foil 16U in the circumferential direction is shorter than that of the others. Thus, the rigidity of the foil assembly 13 is higher for the part below the horizontal plane H that passes through the center Ob of the stationary retaining member 12, than for the part above the horizontal plane H.

By applying a copper coating 18 only to the outer circumference of the lower bump foils 16L, the coefficient of friction between the lower bump foils 16L and the inner circumference of the stationary retaining member 12 becomes larger than the coefficient of friction between the upper bump foils 16U and the inner circumference of the stationary retaining member 12. As a result, when a load is applied from the journal 11 in the radial direction, it becomes difficult for the first contacts 16a of the lower bump foils 16L to slide against the inner circumference of the stationary retaining member 12 thereby increasing the rigidity of the foil assembly part below the horizontal plane H.

Figure 6:
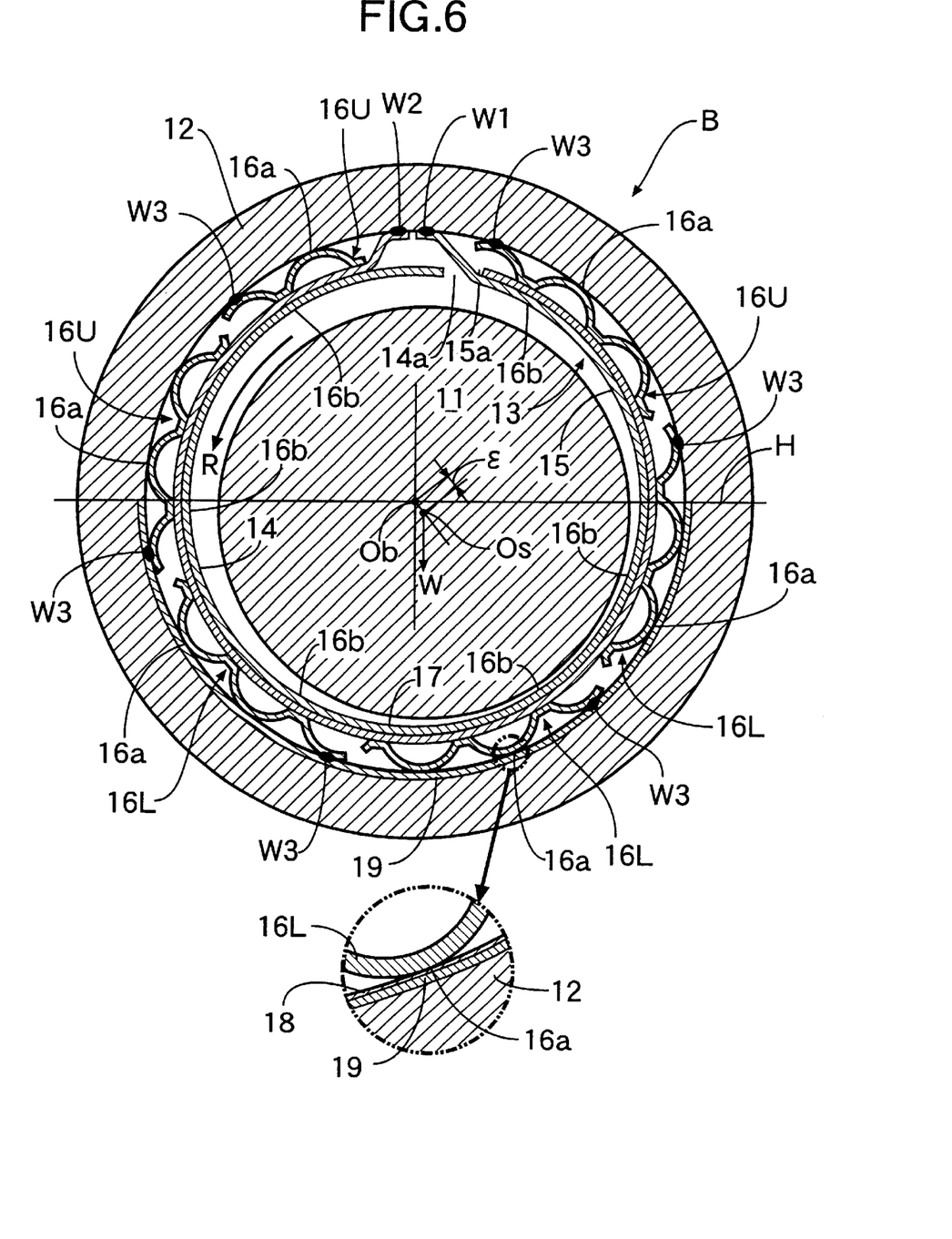
FIG. 6 is a cross-sectional view of a fluid bearing relating to a second embodiment of the present invention.

Although in the present embodiment the copper coating 18 is applied to the outer circumference of the lower bump foils 16L, the same effect can be obtained by applying the copper coating 18 to a part of the inner circumference of the stationary retaining member 12 below the horizontal plane H. Furthermore, as in a second embodiment shown in FIG. 6, a friction foil 19 that has a copper coating 18 applied to its inner circumference may be fixed to the lower part of the inner circumference of the stationary retaining member 12.

Moreover, the rigidity of the lower half of the foil assembly 13 is enhanced in comparison with that of the upper half, by increasing the number of lower bump foils, reducing the gap between the lower bump foils, increasing the thickness of the lower bump foils, and making the lower bump foils from a material that is harder than the upper bump foil material. Also, the partial cylinder parts of the lower bump foils are positioned so that they face radially inward and the partial cylinder parts of the upper bump foils face radially outward.

Figure 7:
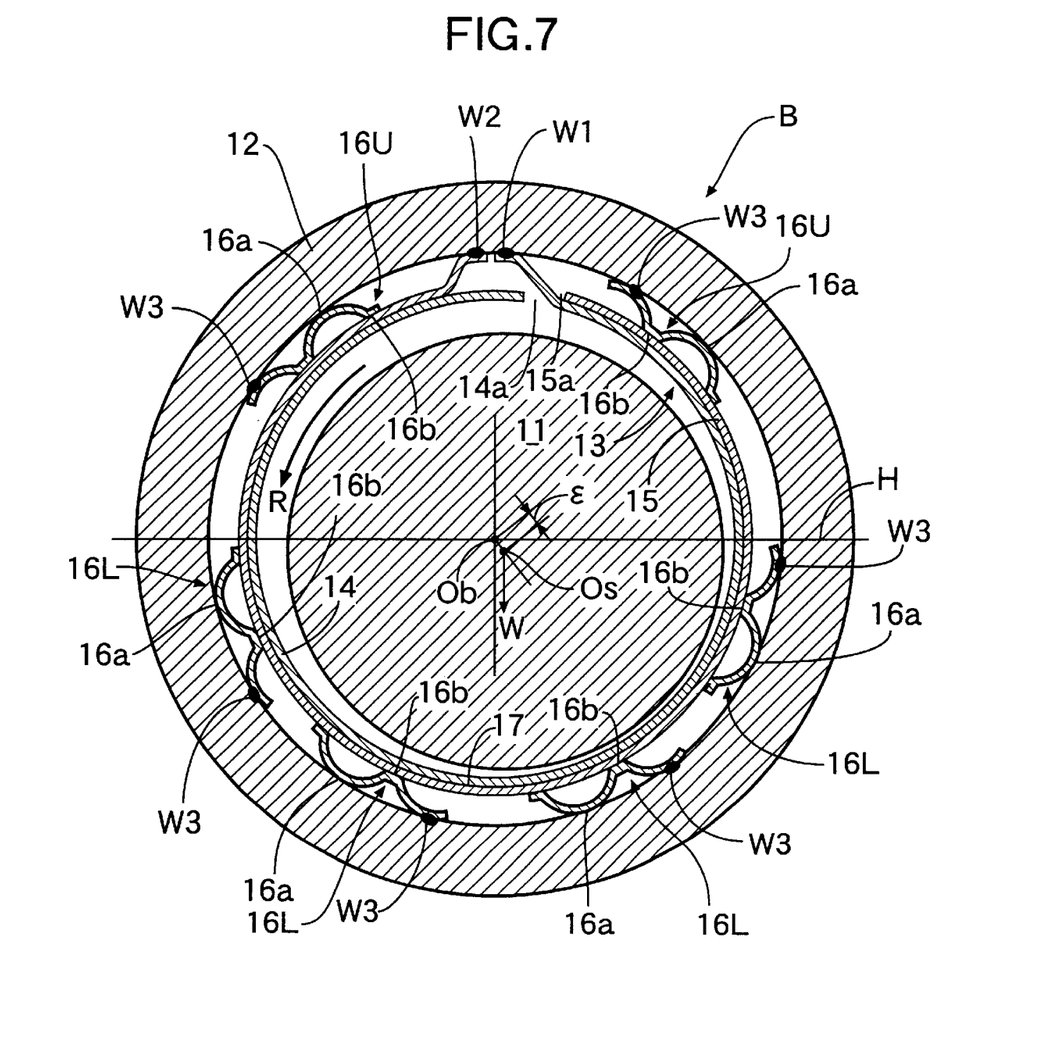
FIG. 7 is a cross-sectional view of a fluid bearing relating to a: third embodiment of the present invention.

As shown in FIG. 7, the foil assembly 13 of the fluid bearing B of la third embodiment comprises four lower bump foils 16L below the horizontal plane H that passes through the center Ob of the stationary retaining member 12 and two upper bump foils 16U, 16U above the horizontal plane H. Therefore, the gap between the lower bump foils 16L in the circumferential direction is smaller than the gap between the upper bump foils 16U, 16U in the circumferential direction. In accordance with the above-mentioned arrangement, the rigidity of the lower half of the foil assembly 13 can be made higher than that of the upper half.

With regard to the foil assembly 13 of the fluid bearing B of a fourth embodiment, since the thickness of the lower bump foils 16L is increased in comparison with the thickness of the upper bump foils 16U, the rigidity of the lower half of the foil assembly 13 can be made higher than that of the upper half.

With regard to the foil assembly 13 of the fluid bearing B of a fifth embodiment, since the lower bump foils 16L are made from a material that is harder than the upper bump foil 16U material, the rigidity of the lower half of the foil assembly 13 can be made higher than that of the upper half.

Figure 8:
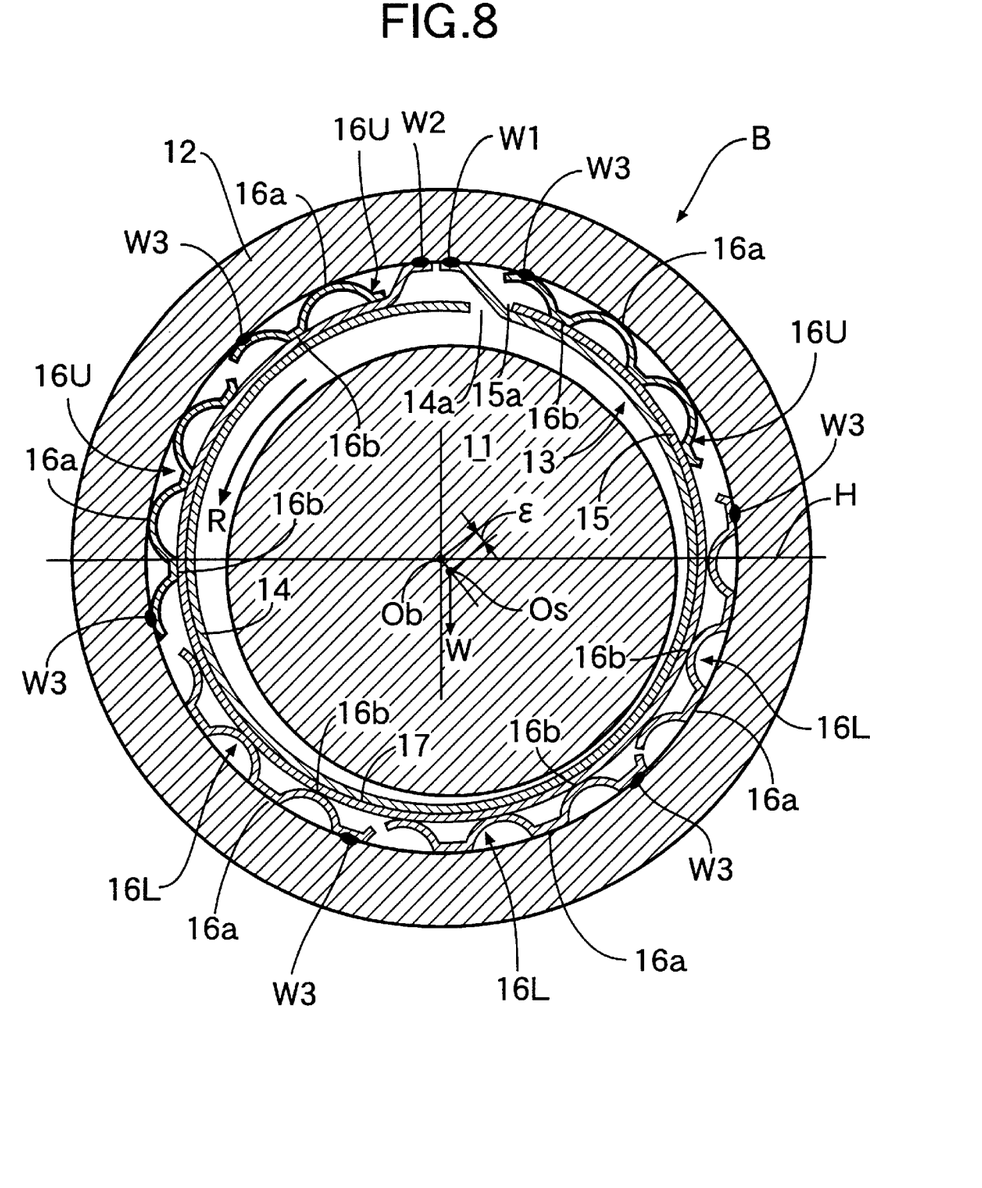
FIG. 8 is a cross-sectional view of a fluid bearing relating to a sixth embodiment of the present invention.

As shown in FIG. 8, with regard to the foil assembly 13 of the fluid bearing B of a sixth embodiment, the lower bump foils 16L are positioned so that their partial cylinder parts face radially inward and the upper bump foils 16U are positioned so that their partial cylinder parts face radially outward. As already explained by reference to FIG. 3B, since the frictional resistance against the inner circumference of the stationary retaining member 12 increases when the partial cylinder parts are positioned to face radially inward, the rigidity of the lower half of the foil assembly 13 can be made higher than that of the upper half.

In addition, it is possible to combine the arrangement of the above-mentioned sixth embodiment with any one of the arrangements of the above-mentioned first to fifth embodiments.

The number of bump foils 16U, 16L and the number of partial cylinder parts formed in the bump foils 16U, 16L are not limited to those described in the embodiments and can be changed appropriately.

As described above, in accordance with the invention, since the bump foils positioned between the inner circumference of the stationary retaining member and the mid-foil comprise a plurality of separations in the circumferential direction, even a small displacement of the journal can cause any one of the bump foils to deform and exhibit a frictional damping force. Thus, it is possible to effectively suppress al small amplitude of vibration of the journal in the region where the rotational rate is low. Since the mid-foil and the top foil are wound in opposite directions from each other, when the journal vibrates with a large amplitude due to the synchronous vibration instability phenomenon, the top foil and mid-foil slide in opposite directions from each other and exhibit a high level of a frictional damping force. Thus, it is possible to effectively suppress the synchronous vibration instability phenomenon. Moreover, since the sum of the frictional damping forces generated by the lower bump foils positioned in the lower half of the stationary retaining member relative to the direction of gravity is larger than the sum of the frictional damping forces generated by the upper bump foils positioned in the upper half, the center of rigidity of the foil assembly is displaced upward relative to the center of the stationary retaining member. Thus, it is possible to effectively suppress the whirl instability phenomenon that occurs in the region where the rotational rate is high.

Furthermore, in accordance with the invention, since the coefficient of friction is changed by applying a coating to at least one area of the sliding faces where the bump foils and the stationary retaining member are in contact with each other, it is possible to further effectively suppress the synchronous vibration instability phenomenon by generating a high level of frictional damping force according to the displacement of the journal in the radial direction.

Furthermore, in accordance with the invention, since the coefficient of friction is changed by providing a friction foil to which a coating has been applied on at least one area of the inner circumference of the stationary retaining member Where the first contacts of the bump foils are in contact, it is possible to further effectively suppress the synchronous vibration instability phenomenon by generating a high level of frictional damping force according to the displacement of the journal in the radial direction.

Furthermore, in accordance with the invention, since the sum of the frictional damping forces generated by the lower bump foils is made larger than the sum of the frictional damping forces generated by the upper bump foils by applying a coating to increase the coefficient of friction, it is possible to effectively suppress the whirl instability phenomenon that occurs in the high rotational rate region.

Furthermore, in accordance with the invention, since the sum of the frictional damping forces generated by the lower bump foils is made larger than the sum of the frictional damping forces generated by the upper bump foils by forming at least one of the lower bump foils to be longer in the circumferential direction than the upper bump foils, it is possible to effectively suppress the whirl instability phenomenon that occurs in the high rotational rate region.

Furthermore, in accordance with the invention, since the sum of the frictional damping forces generated by the lower bump foils is made larger than the sum of the frictional damping forces generated by the upper bump foils by making the number of lower bump foils larger than the number of upper bump foils, it is possible to effectively suppress the whirl instability phenomenon that occurs in the high rotational rate region.

Furthermore, in accordance with the invention, since the sum of the frictional damping forces generated by the lower bump foils is made larger than the sum of the frictional damping forces generated by the upper bump foils by making the circumferential gap between the separated lower bump foils smaller than the circumferential gap between the separated upper bump foils, it is possible to effectively suppress the whirl instability phenomenon that occurs in the high rotational rate region.

Furthermore, in accordance with the invention, since the sum of the frictional damping forces generated by the lower bump foils is made larger than the sum of the frictional damping forces generated by the upper bump foils by forming at least one part of the lower bump foils from a material that is thicker than the material of the upper bump foils, it is possible to effectively suppress the whirl instability phenomenon that occurs in the high rotational rate region.

Furthermore, in accordance with the invention, since the sum of the frictional damping forces generated by the lower bump foils is made larger than the sum of the frictional damping forces generated by the upper bump foils by forming at least one part of the lower bump foils from a material that is harder than the material of the upper bump foils, it is possible to effectively suppress the whirl instability phenomenon that occurs in the high rotational rate region.

Furthermore, in accordance with the invention, since at least a portion of the bump foils comprises a convexly curved face that projects radially outward, it becomes easy for the bump foil to slide against the stationary retaining member, as a result the bump foil deforms from only a small displacement of the journal so exhibiting a frictional damping force and it is possible to effectively suppress a small amplitude of vibration of the journal in the low rotational rate region.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A fluid bearing having a stationary retaining member surrounding an outer circumference of a rotating journal with an annular cavity formed therebetween and a foil assembly positioned in the cavity and supporting the journal, the foil assembly comprising:

a top foil having one end facing a first slit formed therein in the axial direction thereof and being cylindrically wound in one circumferential direction from the one end to the other end and partially disposed around the outer circumference of the rotating journal, the one end being fixed to the stationary retaining member on the upper half of the stationary retaining member relative to the direction of gravity, and supporting the outer circumference of the rotating journal through a fluid film layer, a mid-foil having one end facing a second slit formed therein in the axial direction thereof and being cylindrically wound in the opposite circumferential direction from the one end to the other end, the mid-foil being fixed to the stationary retaining member on the upper half of the stationary retaining member relative to the direction of gravity, the inner circumference of the mid-foil frictionally and slidably contacting an outer circumference of the top foil, thereby generating a fictional damping force counteracting the radially outward movement of the rotating journal, a plurality of bump foils positioned between the mid-foil and the stationary retaining member, the bump foils being circumferentially separated, wherein each of the bump foils is formed as a wave to elastically deform in the radial direction and to stretch and contract circumferentially, one end of each bump foil being fixed to the stationary retaining member, and wherein a frictional damping force counteracting the radially outward movement of the journal is generated by first contacts of the bump foils frictionally and slidably with an inner circumference of the stationary retaining member and second contacts of the bump foils frictionally and slidably with a radially outer circumference of the mid-foil, and wherein the sum of the frictional damping forces generated by the lower bump foils positioned on the lower half of the stationary retaining member relative to the direction of gravity is set to be larger than the sum of the frictional damping forces generated by the upper bump foils positioned on the upper half of the stationary retaining member.

2. A fluid bearing according to claim 1, wherein the plurality of bump foils and the stationary retaining member contact each other forming sliding faces.

3. A fluid bearing according to claim 2, including a coating for changing the coefficient of friction on at least one area of the sliding faces where the plurality of bump foils and the stationary retaining member are in contact with each other.

4. A fluid bearing according to claim 1, wherein a friction foil, having a coating for changing the coefficient of friction, is provided on at least one area of the inner circumference of the stationary retaining member where the first contacts of the bump foils are in contact.

5. A fluid bearing according to claim 3, wherein the coating makes the coefficient of friction of the first contacts of the lower bump foils larger than the coefficient of friction of the first contacts of the upper bump foils.

6. A fluid bearing according to claim 4, wherein the coating makes the coefficient of friction of the first contacts of the lower bump foils larger than the coefficient of friction of the first contacts of the upper bump foils.

7. A fluid bearing according to claim 1, wherein at least one of the lower bump foils is circumferentially longer than the upper bump foils.

8. A fluid bearing according to claim 1, wherein a number of lower bump foils is larger than a number of upper bump foils.

9. A fluid bearing according to claim 1, wherein a circumferential distance between the circumferentially separated lower bump foils is smaller than a circumferential distance formed between the upper bump foils.

10. A fluid bearing according to claim 1, wherein at least one part of the lower bump foils is formed from a material being thicker than a material of the upper bump foils.

11. A fluid bearing according to claim 1, wherein at least one part of the lower bump foils is formed from a material being harder than a material of the upper bump foils.

12. A fluid bearing according to any one of claims 1 to 11, wherein at least a portion of the bump foils further comprises a convexly curved face projecting radially outward therefrom.

13. A fluid bearing according to claim 1, further including a fluid layer wherein the top foil supports the outer circumference of the journal through the fluid film layer.

* * * * *